United States Patent
Pelage et al.

(10) Patent No.: US 6,668,956 B1
(45) Date of Patent: Dec. 30, 2003

(54) DEVICE FOR MOUNTING A RADIATOR ON A VEHICLE SUPPORT

(75) Inventors: Lucien Pelage, Vernon (FR); Sébastien Brogly, St. Just (FR)

(73) Assignee: Peguform France, Saint-Marcel (FR)

( * ) Notice: Subject to any disclaimer, the term of this patent is extended or adjusted under 35 U.S.C. 154(b) by 0 days.

(21) Appl. No.: 09/980,151

(22) PCT Filed: May 17, 2000

(86) PCT No.: PCT/FR00/01314

§ 371 (c)(1),
(2), (4) Date: Dec. 17, 2001

(87) PCT Pub. No.: WO00/71376

PCT Pub. Date: Nov. 30, 2000

(30) Foreign Application Priority Data

May 20, 1999 (FR) .......................................... 99 06405

(51) Int. Cl.[7] .............................................. B60K 11/04
(52) U.S. Cl. ...................... 180/68.4; 180/312; 248/232
(58) Field of Search ................ 180/68.4, 312, 180/300; 248/635, 232, 233; 165/67, 69

(56) References Cited

U.S. PATENT DOCUMENTS

| | | | | |
|---|---|---|---|---|
| 4,519,467 A | * | 5/1985 | Saunders .................... | 180/68.4 |
| 4,564,168 A | * | 1/1986 | Ikuta et al. ................. | 248/638 |
| 4,579,184 A | * | 4/1986 | Hiramoto .................... | 180/68.4 |
| 4,651,839 A | * | 3/1987 | Isobe ........................ | 180/68.4 |
| 4,742,881 A | * | 5/1988 | Kawaguchi et al. ......... | 180/68.4 |
| 4,770,234 A | * | 9/1988 | Hiraoka et al. ............. | 165/69 |
| 4,773,496 A | * | 9/1988 | Brielmair ................... | 180/68.4 |
| 4,783,039 A | * | 11/1988 | Peterson et al. ............ | 248/635 |
| 4,821,828 A | * | 4/1989 | Schwerzler et al. ........ | 180/68.4 |
| 4,858,866 A | * | 8/1989 | Werner ...................... | 248/213.3 |
| 5,078,224 A | * | 1/1992 | Attinger et al. ............. | 180/68.4 |
| 5,131,619 A | * | 7/1992 | Daugherty et al. ......... | 248/635 |
| 5,335,893 A | * | 8/1994 | Opp ........................... | 248/635 |
| 5,544,714 A | * | 8/1996 | May et al. .................. | 180/68.4 |
| 5,558,310 A | * | 9/1996 | Furuie et al. ............... | 248/573 |
| 5,658,041 A | * | 8/1997 | Girardot et al. ............ | 296/194 |
| 5,685,364 A | * | 11/1997 | Harris ........................ | 165/67 |
| 5,704,418 A | * | 1/1998 | Baader et al. .............. | 165/121 |
| 5,758,860 A | * | 6/1998 | Hanazaki et al. ........... | 248/634 |
| 5,785,140 A | * | 7/1998 | Suzuki et al. ............... | 180/68.4 |
| 5,996,684 A | * | 12/1999 | Clifton et al. ............... | 165/67 |
| 6,189,958 B1 | * | 2/2001 | Guyomard et al. ......... | 296/194 |
| 6,260,609 B1 | * | 7/2001 | Takahashi ................... | 165/69 |
| 6,412,581 B2 | * | 7/2002 | Enomoto et al. ........... | 180/68.4 |

FOREIGN PATENT DOCUMENTS

| | | | | |
|---|---|---|---|---|
| DE | 3916777 A1 | * | 4/1990 | .......... B60K/11/04 |
| DE | 197 44 173 | | 4/1999 | |
| EP | 908344 A2 | * | 4/1999 | .......... B60K/11/04 |

* cited by examiner

Primary Examiner—Brian L. Johnson
Assistant Examiner—Kelly E Campbell
(74) Attorney, Agent, or Firm—Brooks Kushman P.C.

(57) ABSTRACT

The system for fixing a cooling member to a vehicle comprises a support (2) having an orifice (18) and a free edge, together with a fixing piece (30) presenting an orifice (32) and a free edge. The support (2) presents a notch (20) extending from its orifice (18) to its free edge, and the fixing piece (30) presents a notch (36) extending from its orifice (32) to its free edge, the fixing piece (30) being suitable for being mounted to turn relative to the support (2) with the orifices (18, 32) coaxial.

14 Claims, 4 Drawing Sheets

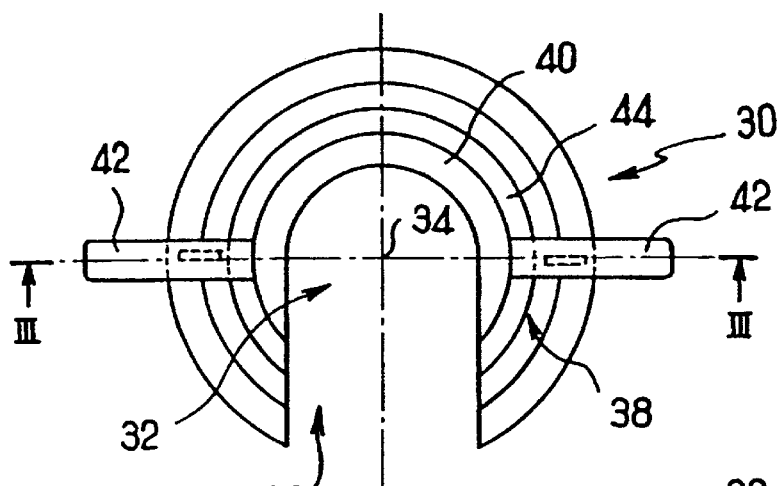
FIG_2
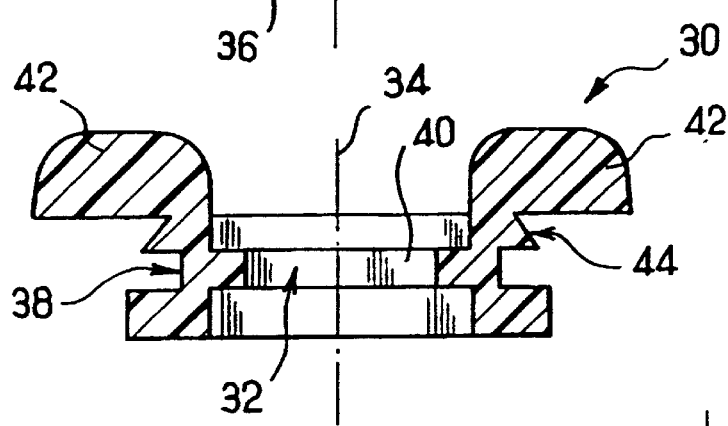
FIG_3
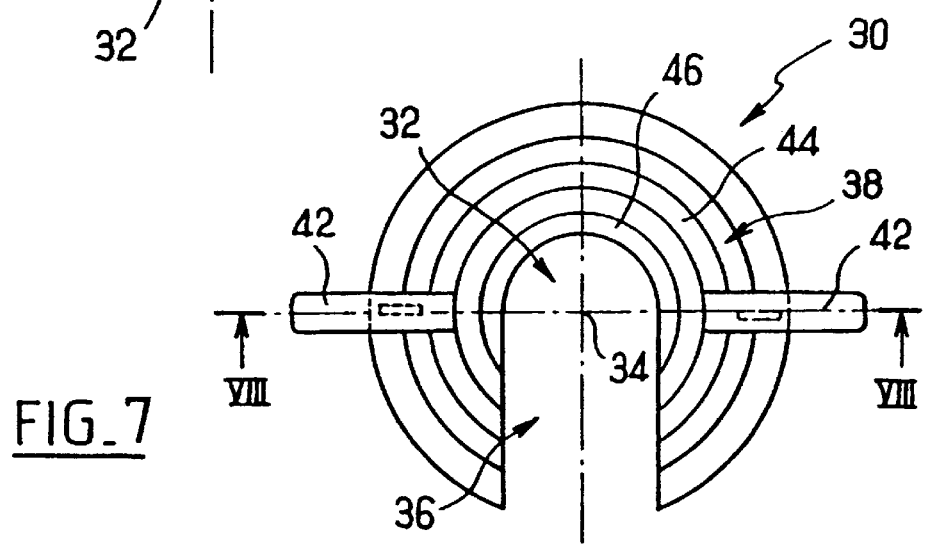
FIG_7
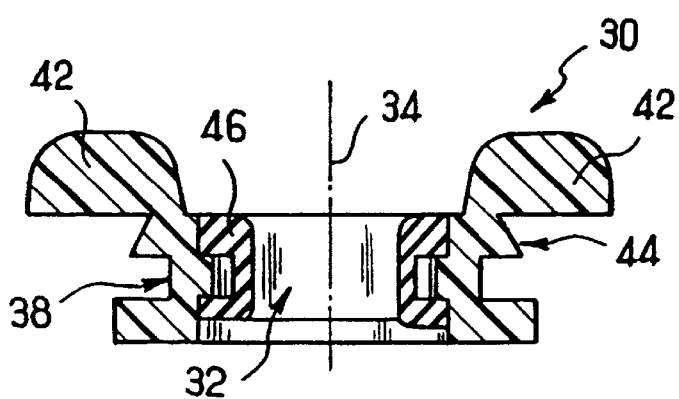
FIG_8

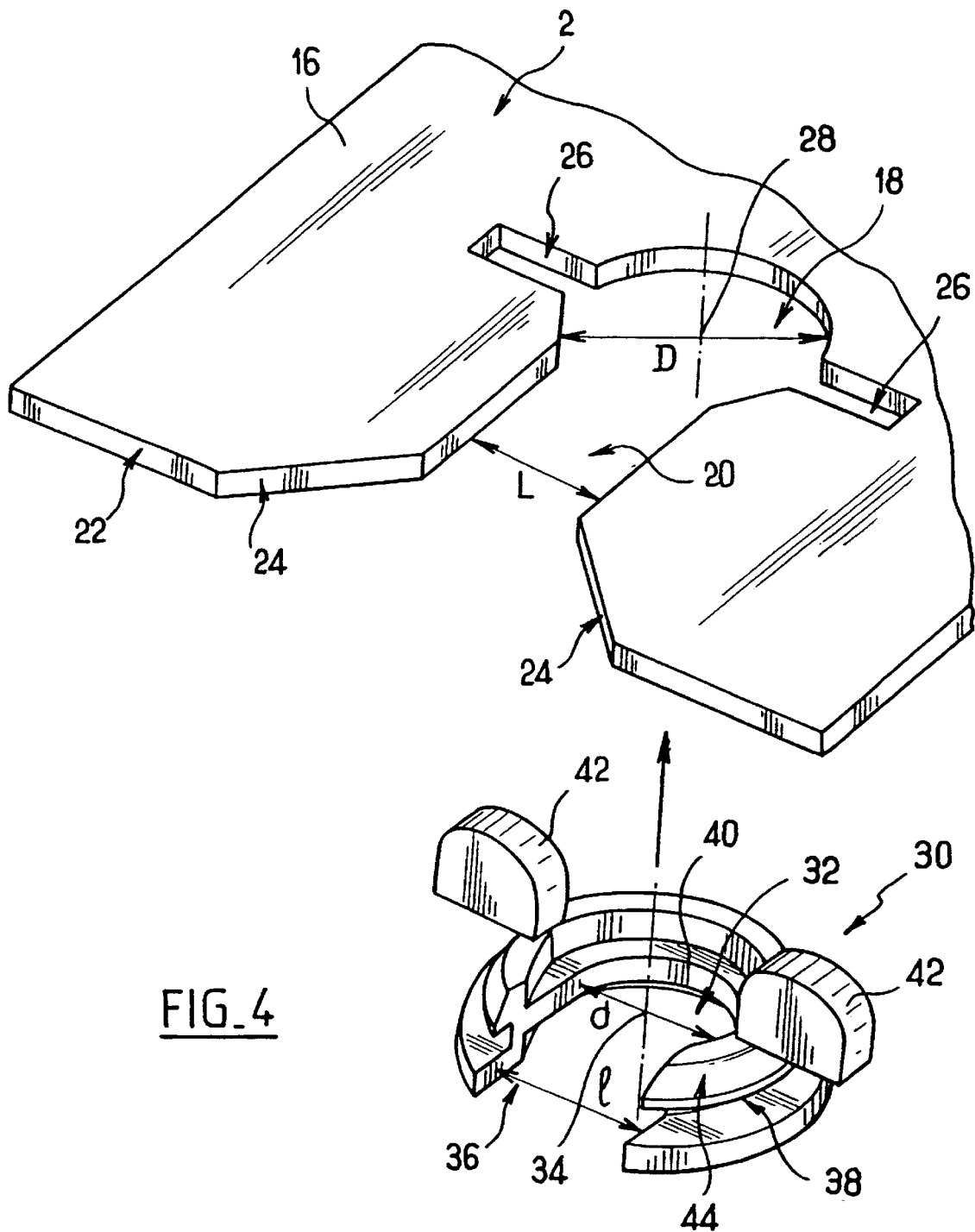
FIG_4

DEVICE FOR MOUNTING A RADIATOR ON A VEHICLE SUPPORT

BACKGROUND OF THE INVENTION

The invention relates to fixing a cooling member such as a radiator or an air-air heat exchanger to a vehicle.

In a vehicle, the cooling member, e.g. the radiator, is often fixed to a support that can be referred to as an engine-compartment front facade. In such a conventional fixing system, bottom projections of the radiator are inserted into corresponding cavities in the facade. Thereafter top pegs on the radiator have fixing tabs engaged thereon, and the tabs are then fixed to the facade by means of respective screws. That fixing system suffers from the drawback of requiring access to the rear face of the facade in order to engage the tabs on the pegs, and to its front face in order to tighten the screws. Furthermore, it is difficult to achieve clamping without applying force, and while also ensuring that the radiator is accurately parallel to the facade, given that the tabs are not prevented from rotating relative to the radiator. That system thus requires a considerable amount of time for assembly, it suffers from major risks in terms of quality, and it gives rise to considerable

SUMMARY OF THE INVENTION

An object of the invention is to provide a fixing system that accelerates the fixing of the cooling member on the facade while reducing the cost thereof and while improving the quality of the fixing.

To achieve this object, the invention provides a system for fixing a cooling member to a vehicle, the system comprising: a support having an orifice and a free edge; and a fixing piece presenting an orifice and a free edge; in which: the support presents a notch extending from its orifice to its free edge; and the fixing piece presents a notch extending from its orifice to its free edge; the fixing piece being suitable for being mounted to turn relative to the support when the orifices are coaxial.

In this way, since the fixing piece is received on the support with the two notches in correspondence, it suffices to insert the peg of the cooling member into the notches all the way to the orifice of the fixing piece, and then to turn the fixing piece in order to take the notches out of correspondence. At which point the peg is held captive in the orifice of the fixing piece. The peg is thus fixed in a manner that is simple and fast. Assembly does not require a high level of force on the part and does not disturb parallelism. The cost of the fixing system is reduced.

Advantageously, the fixing piece has a groove suitable for receiving an edge of the orifice of the support.

Advantageously, the fixing piece is suitable for being received in the orifice of the support by snap-fastening in a direction parallel to an axis of said orifice.

The fixing piece is thus simple to mount onto the support.

Advantageously, the fixing piece has at least one tab for turning the piece when mounted on the support.

Advantageously, the support presents at least one second notch for passing the tab.

The fixing piece can thus be clipped without needing to pass the tabs into the main notch. For example, the notch for passing the tab can be placed in such a manner that the fixing piece is clipped directly with the two main notches in correspondence.

Advantageously, the fixing piece has an inside face formed by an element made of a material for damping mechanical vibration.

This reduces the transmission of mechanical vibration between the support and the cooling element.

Advantageously, the fixing piece comprises a body to which the damping element is fixed.

The fixing piece can thus be made out of two materials, by being molded together or by molding one on the other, for example.

Advantageously, the fixing piece is a ring.

The invention also provides a vehicle subassembly comprising a system of the invention.

Advantageously, the subassembly includes a facade forming the support.

Advantageously, the facade is made of a fiber-reinforced plastics material.

Advantageously, the subassembly includes a cooling member presenting a peg suitable for being received in the orifice of the fixing piece mounted on the support through the notches.

BRIEF DESCRIPTION OF THE DRAWINGS

Other characteristics and advantages of the invention will appear further from the following description of a preferred embodiment and of a variant given as non-limiting examples. In the accompanying drawings:

FIG. 2 is a plan view of a fixing piece in a preferred embodiment of the system of the invention;

FIG. 3 is an axial section view on plane III—III through the piece of FIG. 2;

FIGS. 4, 5, and 6 are fragmentary perspective views of the fixing system of the present embodiment showing three steps in mounting the system and in fixing the cooling element; and FIGS. 7 and 8 are two views analogous to FIGS. 2 and 3 showing a variant embodiment.

DETAILED DESCRIPTION OF THE PREFERRED EMBODIMENT(S)

Figure 1:
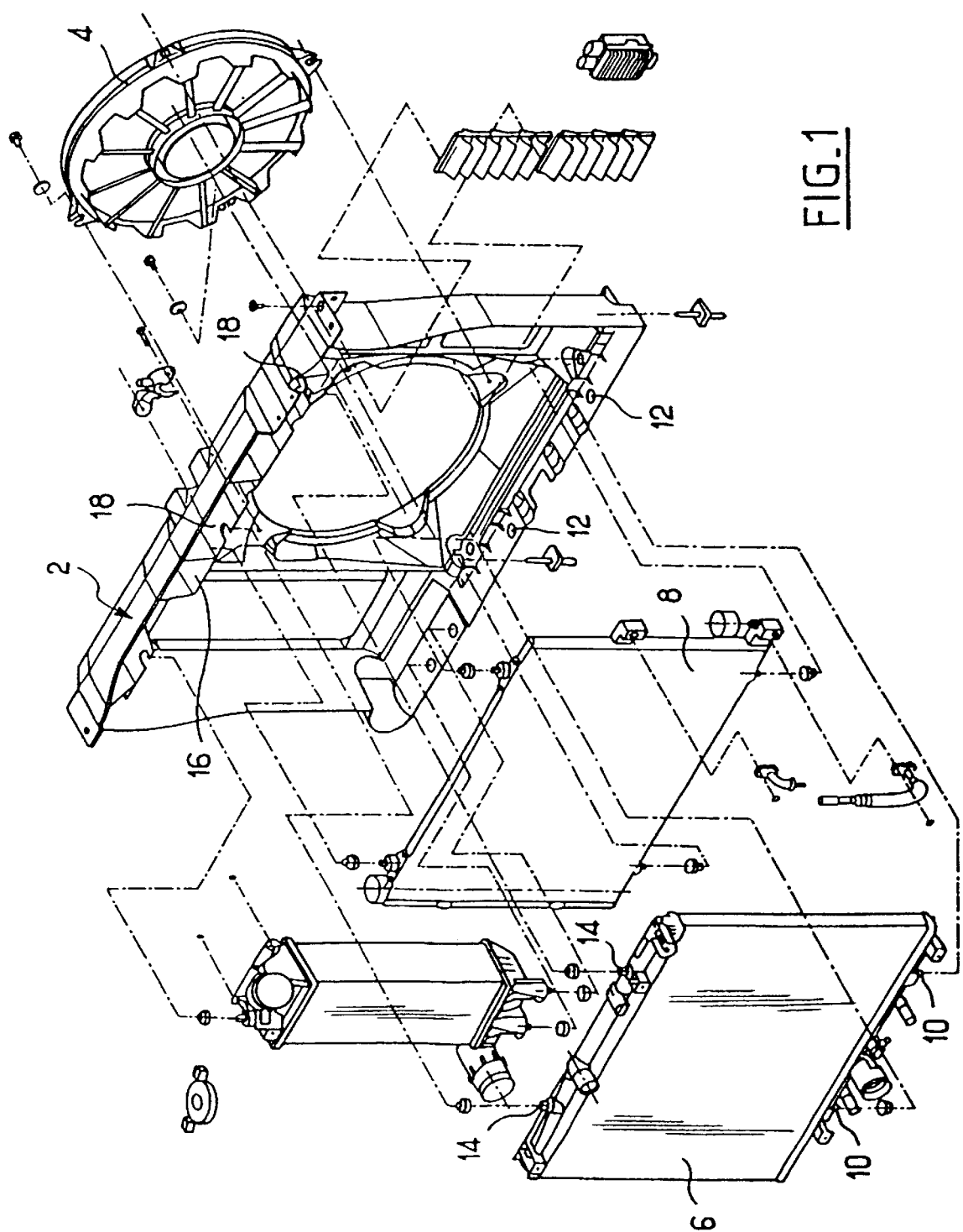
FIG. 1 is an exploded perspective view of the environment of the front facade of a vehicle.

FIG. 1 shows the environment of the front facade the engine compartment of a motor vehicle. The facade 2 is to support a motor-driven fan unit 4 whose rear portion is fixed in a central orifice through the facade, and also to support a cooling device 6, in this case a radiator, together with a condenser 8 interposed between the radiator 6 and the facade 2, these three elements all extending vertically.

The general shape of the radiator 6 is that of a rectangular parallelepiped that is very flat in one horizontal direction. Its horizontal bottom edge carries two vertical-axis studs 10 for being received in two bottom orifices 12 of the facade 2. On its horizontal top edge, it carries two vertical-axis pegs 14.

The facade 2 comprises a wall 16 which extends horizontally rearwards from a main vertical wall of the facade. At the locations for fixing the two pegs 14, the wall 16 has two circular orifices 18. Since both pegs are fixed in the orifices in identical manner, the description below relates to only one peg 14 and its fixing orifice 18.

With reference to FIG. 4, each orifice 18 is associated with a notch 20 having parallel straight edges extending from the orifice 18 to the free edge 22 of the wall 16. Chamfers 24 are provided where the notch 20 joins the free edge 22. The notch is of width L that is less than a diameter D of the orifice 18. The wall 16 also has two secondary notches 26 extending in the wall 16 from the orifice 18. The two secondary notches are diametrally opposite from each other in this case about an axis 28 of the orifice.

With reference to FIGS. 2 to 4, for each orifice 18, the system comprises a fixing piece which is in the form of a ring 30. The ring is generally annular in shape. In its center it has an orifice 32 about an axis 34. It also presents a notch 36 extending from the orifice 32 to an outside edge of the ring that is free so that the ring extends over an arc only of a circle and is open on one side. In this case, the width l of the notch 36 is equal to the diameter d of the orifice 32. In addition, the diameter d of the orifice 32 and the width l of the notch 36 are both equal to the width L of the main notch 20 in the wall 16.

On its outside face, the ring 30 presents a channel-section groove 38 with a flat bottom. It has a circumferential internal groove 40. The ring carries two tabs 42 projecting from the top face and the outline of the ring. The two tabs 42 are generally flat and coplanar, and they are diametrally opposite each other on either side of the axis 34. On the top face of the ring, i.e. beside the tabs 42, the ring presents a chamfer 44. The outside diameter of the ring in the bottom of the groove 38 is equal to the diameter D of the orifice 18 in the wall 16.

Prior to fixing the radiator 6 to the facade 2, it is advantageous to mount each of the rings 30 on the facade. To do this, the ring 30 is brought under the orifice 18 in the wall 16, as shown in FIG. 4. It is then positioned in such a manner that its tabs 42 are vertically under the respective ones of the secondary notches 36 and that the main notches 20 and 36 are vertically in register, so that the two axes 28 and 34 coincide.

The chamfer 44 is pressed against the orifice 18 (thereby facilitating mutual centering of the two elements), and the tabs 42 are pressed into the secondary notches 26. Applying vertical upward thrust on the ring 30 causes the circular arc constituted by the ring to shrink slightly because of the resilience of the ring and the effect of the chamfer 44 against the edge of the orifice 18, thereby enabling the ring to be installed in the orifice so as to be snap-fastened in the position shown in FIG. 5. In this position, the edge of the orifice 18 extends into the bottom of the groove 38, and the flanks of the groove lie respectively above and below the wall 16. The tabs 42 project above the secondary notches 26 through which they have passed. The main notches 20 and 36 are in correspondence and are in line with each other. Although not yet necessary at this stage of assembly, the ring 30 is thus mounted so as to be free to rotate relative to the wall 16 about the coincident axes 28 and 34.

Figure 5:
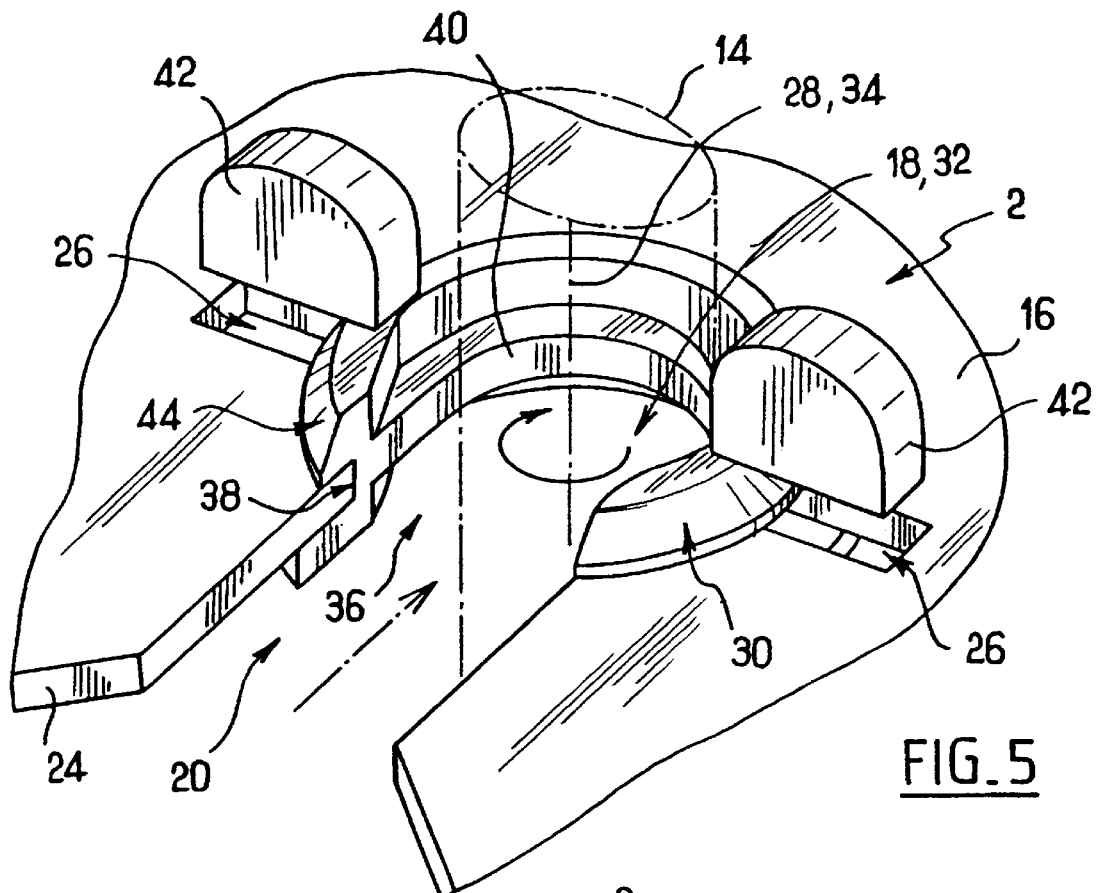
Figure 6:
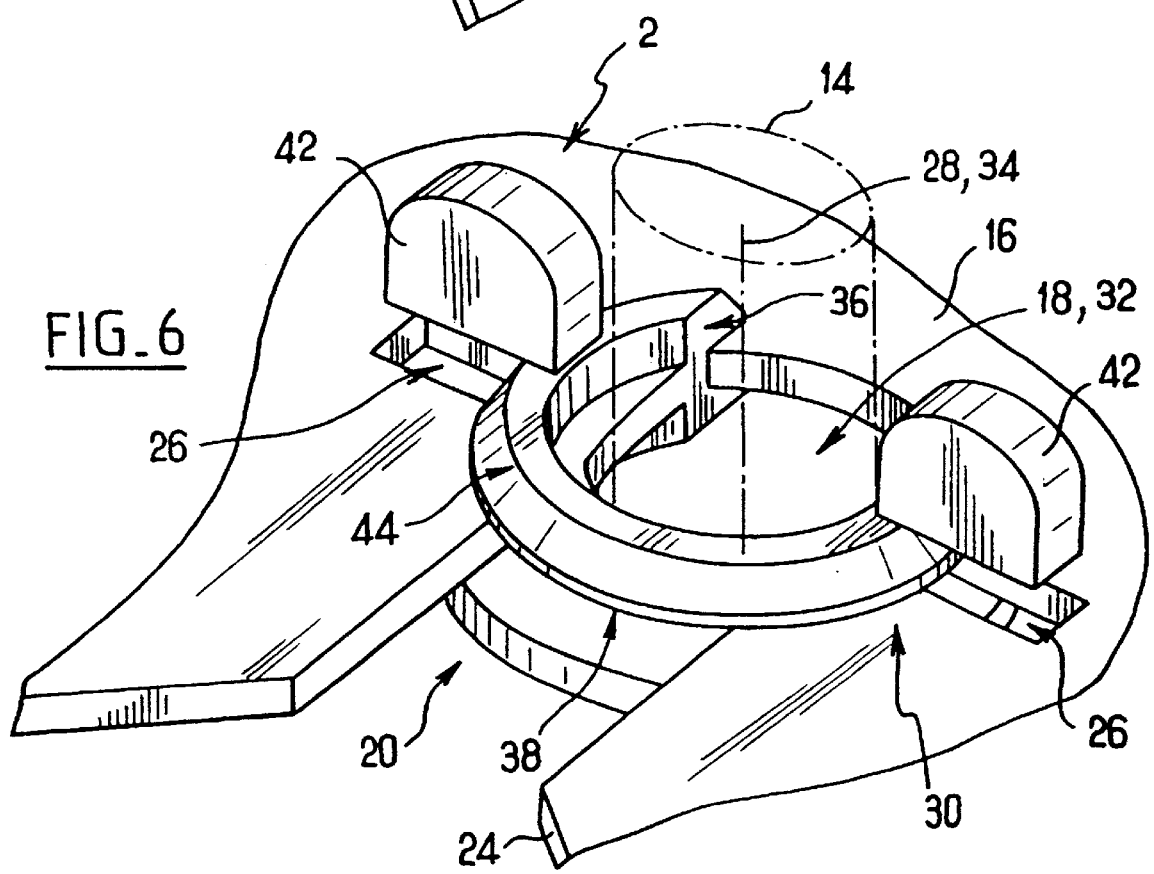

Thereafter, to fix the radiator 6 to the facade 2, the bottom studs 10 are inserted into the bottom orifices 12 of the facade. To perform this operation, the radiator is held in a sloping position relative to the vertical facade. Thereafter, by tilting the radiator up towards the facade, its top pegs 14 are inserted into the respective notches 20, 36 until they reach the orifices 32 in the rings. In FIGS. 5 and 6, the peg 14 is represented by chain-dotted lines. This insertion is made easier by the guidance provided by the chamfers 24. Thereafter, it suffices to turn each of the rings 30 so that it rotates in its housing about the axes 28 and 34 by acting on the wing-nut tabs 42 so that the ring turns through an angle that is sufficient to cause the main notches 20 and 36 to move out of correspondence with each other, thereby holding the peg 14 captive in the ring. By way of example, this angle can be 90° or 180° as shown in FIG. 6.

In this case, the facade 2 is made of plastics material such as polypropylene reinforced by long glass fibers. Each ring 30 is made of plastics material and comprises a single piece. FIGS. 7 and 8 show a variant embodiment of the ring 30. It will be understood that on this occasion the ring comprises a plastics material body that is substantially identical to the previous ring, together with a circularly arcuate element 46 of a vibration-damping material, e.g. an elastomer. This element is a channel-section strip, with the channel being open in an outward direction and being mounted on the groove 40 which it covers. The element 46 thus constitutes the inside face of the ring. The ring 30 comes into contact with the peg 14 solely via the element 46, thus contributing to damping the transmission of mechanical vibration between them. The inside diameter d of the ring is thus measured across the element 46. The inside diameter of the plastics material body is thus greater than in the preceding embodiment.

Naturally, numerous modifications can be applied to the invention without thereby going beyond the ambit thereof.

The chamfer 44 could be provided on the orifice 18.

The ring can be arranged so as to fix to the wall, not by snap-fastening, but by being inserted sideways into the main notch 20: the groove 38 can then have a diameter that varies as a function of the region of the groove under consideration, with the smallest diameter region serving for insertion into the notch 20.

The overall shape of the fixing piece could be other than ring-shaped.

The tabs 42 could be placed beneath the ring, in which case they would not need to penetrate through the wall 16.

The ring 30 could be mounted to turn on the wall 16 with the orifices 18 and 32 being coaxial but spaced apart from each other.

What is claimed is:

1. A system for fixing a cooling member (6) to a vehicle, the system comprising:
    a support (2) having a support orifice (18) and a support free edge (22); and
    a fixing piece (30) presenting a fixing piece orifice (32) and a fixing piece free edge;
    the system being characterized in that:
        the support (2) presents a notch (20) extending from the support orifice (18) to the support free edge (22), and receives the fixing piece in the support orifice; and
        the fixing piece (30) presents a notch (36) extending from the fixing piece orifice (32) to the fixing piece free edge; the fixing piece (30) having flanks enabling the fixing piece to be snap-fastened in the support and rotatable relative to the support (2) when the support and fixing piece orifices (18, 32) are coaxial.

2. A system according to claim 1, characterized in that the fixing piece (30) has a groove (38) suitable for receiving an edge of the support orifice (18).

3. A system according to claim 2, characterized in that the groove is circular.

4. A system according to claim 1, characterized in that the fixing piece (30) is received in the support orifice (18) by snap-fastening in a direction parallel to an axis (28) of said support orifice.

5. A system according to claim 4, characterized in that the fixing piece further comprises a chamfer (44) configured to facilitate mutual centering of the support and the fixing piece.

6. A system according to claim 1, characterized in that the fixing piece (30) has at least one tab (42) for turning the piece when mounted on the support (2).

7. A system according to claim 6, characterized in that the support (2) presents at least one second notch (26) for passing the tab (42).

8. A system according to claim 1, characterized in that the fixing piece (30) has an inside face formed by an element (46) made of a material for damping mechanical vibration.

9. A system according to claim 8, characterized in that the fixing piece (30) comprises a body to which the damping element (46) is fixed.

10. A system according to claim 1, characterized in that the fixing piece (30) is a ring.

11. A vehicle subassembly, characterized in that it includes a system according to claim 1.

12. A subassembly according to claim 11, characterized in that it includes a facade (2) forming the support.

13. A subassembly according to claim 12, characterized in that the facade (2) is made of a fiber-reinforced plastics material.

14. A subassembly according to claim 11, characterized in that the subassembly includes a cooling member (6) presenting a peg (14) that is received in the fixing piece orifice (32) mounted on the support (2) through the notches (20, 36).

* * * * *